US010692350B2

(12) United States Patent
Cho et al.

(10) Patent No.: US 10,692,350 B2
(45) Date of Patent: Jun. 23, 2020

(54) ALERTING SYSTEM AND METHOD

(71) Applicant: Palantir Technologies Inc., Palo Alto, CA (US)

(72) Inventors: Hongjai Cho, Culver City, CA (US); Austin Czarnecki, London (GB); Steven Fackler, Menlo Park, CA (US); Can Guler, London (GB); Nikhil Taneja, New York, NY (US); David Tobin, Atherton, CA (US); Wilson Wong, Menlo Park, CA (US)

(73) Assignee: Palantir Tschngmgies Inc., Palo Alto, CA (US)

( * ) Notice: Subject to any disclaimer, the term of this patent is extended or adjusted under 35 U.S.C. 154(b) by 0 days.

(21) Appl. No.: 16/689,915

(22) Filed: Nov. 20, 2019

(65) Prior Publication Data

US 2020/0118414 A1      Apr. 16, 2020

Related U.S. Application Data

(63) Continuation of application No. 16/406,766, filed on May 8, 2019, now Pat. No. 10,515,533, which is a continuation of application No. 15/949,875, filed on Apr. 10, 2018, now Pat. No. 10,347,113.

(60) Provisional application No. 62/483,700, filed on Apr. 10, 2017.

(51) Int. Cl.
*G08B 21/18* (2006.01)
*G08B 25/10* (2006.01)
*G06F 3/0484* (2013.01)

(52) U.S. Cl.
CPC ......... *G08B 21/187* (2013.01); *G08B 21/182* (2013.01); *G08B 25/10* (2013.01); *G06F 3/04847* (2013.01)

(58) Field of Classification Search
CPC ..... G08B 21/182; H04L 41/22; B08B 21/187; G06F 3/04847
See application file for complete search history.

(56) References Cited

U.S. PATENT DOCUMENTS

| 8,477,041 B2 * | 7/2013 | Hu | H01M 8/04007 340/636.1 |
| 2016/0357828 A1 * | 12/2016 | Tobin | G06F 16/2477 |
| 2017/0139558 A1 * | 5/2017 | Cervelli | G06F 3/04842 |

* cited by examiner

*Primary Examiner* — Omeed Alizada
(74) *Attorney, Agent, or Firm* — Schwegman Lundberg & Woessner, P.A.

(57) ABSTRACT

Aspects of the present disclosure relate to alerting. A server accesses a user-provided specification, the user-provided specification indicating an initial alert range for a measured value and a subsequent alert schedule for the measured value. The server monitors a physical measurement of the measured value. The server determines that the physical measurement falls within the initial alert range. The server provides an initial alert in response to the physical measurement falling within the initial alert range. The server provides a subsequent alert according to the subsequent alert schedule in the user-provided specification.

20 Claims, 7 Drawing Sheets

300

NEW ALERT ✕

Alert Type
[ Temperature ▽ ]

Output
[ Email ▽ ]

Region
[ Alabama ▽ ]

City
[ Birmingham ▽ ]

Location
[ University of Alabama ▽ ]

Point
[ University Weather Stn ▽ ]

Alert if Temperature is
[ Above ▽ ]

Value
[ 32°C ▽ ]

[ Cancel ]    [ Create Alert ]

FIG. 3

ALERTING SYSTEM AND METHOD

PRIORITY CLAIM

This application is a continuation of U.S. patent application Ser. No. 16/406,766, filed on May 8, 2019, which claims priority to and is a continuation of U.S. patent application Ser. No. 15/949,875, filed on Apr. 10, 2018, which claim priority to U.S. Provisional Patent Application No. 62/483,700, filed on Apr. 10, 2017, entitled "ALERTING SYSTEM AND METHOD," the entire content of which are incorporated herein by reference.

TECHNICAL FIELD

The subject matter disclosed herein relates to a machine for providing alerts. In particular, example embodiments may relate to an alert-generating machine that provides alerts based on sensor data.

BACKGROUND

In some cases, a user may be charged with monitoring a value (e.g., a temperature, a pressure, a light level, a noise level, an altitude, a velocity, an acceleration, a flow rate, force, torque and the like). The user may monitor the value only during certain times, for example during business hours but not during off hours. In addition, the user may have to process a large amount of data in a small amount of time. Systems and methods for automatically monitoring the value and alerting the user may be desirable.

BRIEF DESCRIPTION OF THE DRAWINGS

Various ones of the appended drawings merely illustrate example embodiments of the present inventive subject matter and cannot be considered as limiting its scope.

FIG. 3 illustrates an example user interface for a user to request an alert based on a condition measured by a sensor, according to some embodiments.

DETAILED DESCRIPTION

Figure 1:
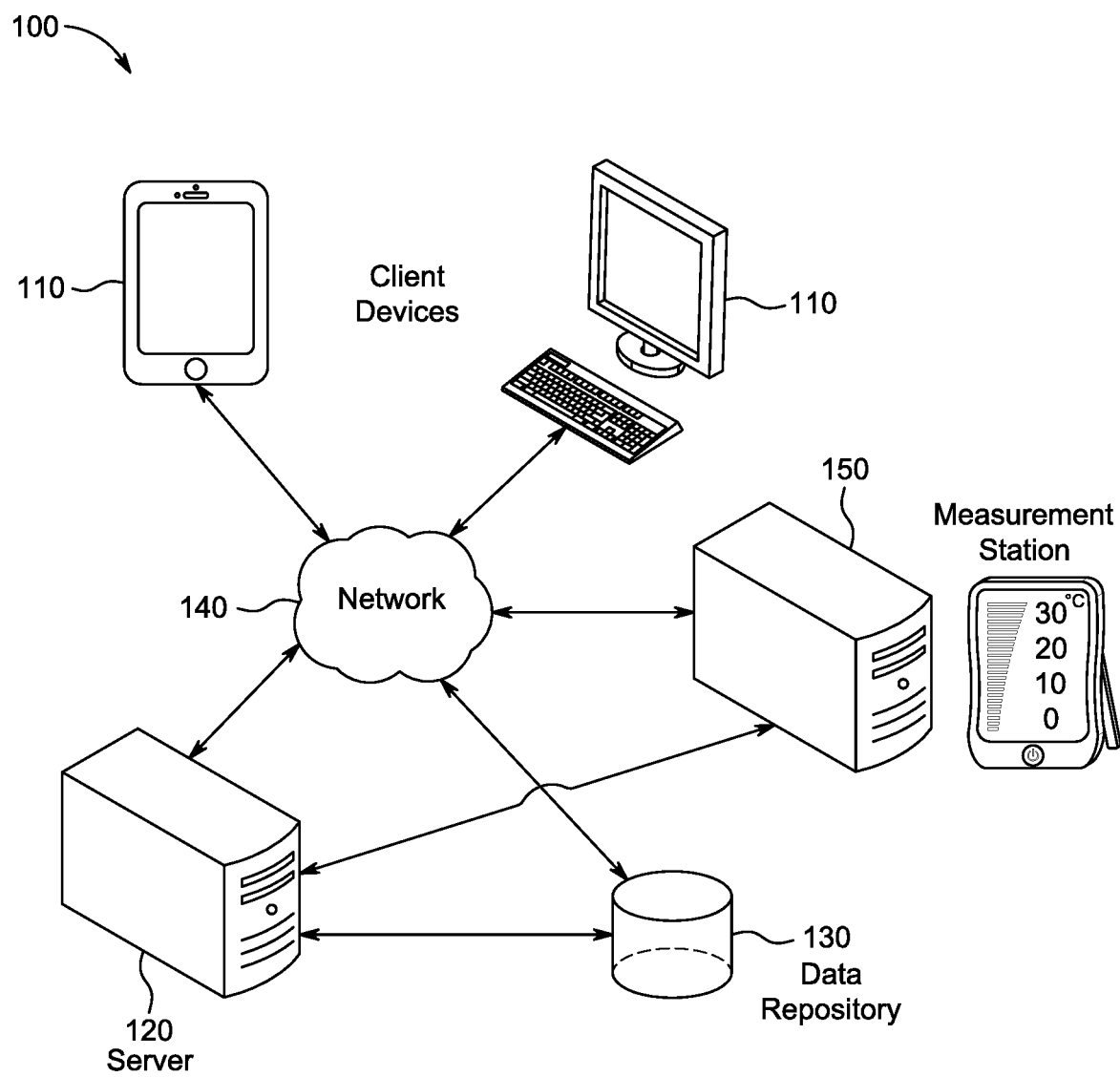
FIG. 1 illustrates an example system in which alerts may be provided, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As discussed above, systems and methods for automatically monitoring a measured value, and providing an alert if the measured value falls into, above, or below a certain range, may be desirable. For example, an engineer (or a computerized system in place of a human engineer) may monitor the operating temperature and pressure of a machine. However, the engineer may not be monitoring the machine during off hours. As a result, if the operating temperature or pressure of the machine changes during off hours, the temperature or pressure change might not be detected, possibly causing damage or resulting in poor operation of the machine. Systems and methods for alerting engineers of unusual operating conditions of machines are desirable to catch issues before they become catastrophic. In some cases, a very large volume of sensor-produced data may need to be processed, and some form of alerting may be useful so that a human user (who is not 100% successful at noticing values in or out of a range) is not required to go through multiple pages (or screens) of data. Aspects of the subject technology are directed to alerting a user that a measured value is within, above, or below an alert range set by the user, allowing the user to effectively process a large amount of data in a limited amount of time.

The subject technology may be implemented in any context where alerting based on sensor data is useful. Applications may include the construction industry, the manufacturing industry (including chemical and textile manufacturing), the natural resource and mining industry (including oil and gas production), the transportation industry (including aviation and traffic management), the utilities industry, or cyber data analysis throughout industries. The subject technology may be useful whenever a large amount of data has to be processed in a limited amount of time. Sensors may produce large amounts of data with a lot of noise, making it difficult for a user to identify signals, especially in sufficient time to take corrective actions. The subject technology may allow users to receive critical alerts as sensor data is streaming real time.

In some aspects, the subject technology relates to alerting continuously over streaming data. Data may be streamed to a server from sensor(s). In some cases, data is received from a single sensor. Alternatively, data from multiple sensors is combined using operations (e.g., using arithmetic). Depending on the type of indicated operation(s) to be performed, the server may perform pointwise operations or sliding window operations. For example, if performing an addition operation, the server may take single data values from the same time-series data file or from different time-series data files and execute the operation on the single data values to generate a new data value. As another example, if performing a zScore operation, the server may take a window of data values (for example, a plurality of data values) and execute the operation on the window of data values taken as a whole to generate a new data value.

The server can perform the indicated operations on time-series data sets that have matching timestamp values. For example, the server can execute an operation on data values from different time-series data sets if the data values correspond to the same timestamp value. In some cases, however, the timestamp values from two or more different time-series data sets may not align. In such a situation, the server may perform interpolation to estimate data values that may correspond to any missing timestamp values. The interpolation may occur prior to executing the operation or during execution of the operation (i.e., in real time). For example, interpolation may occur once the server receives a data value for a timestamp not present in another time-series data set that is being processed.

Time-series data originating from a single data source may be stored in multiple data files. If the multiple data files include overlapping ranges of timestamp values (e.g., a first data file includes timestamps at a first time, a second time, and a third time, and a second data file includes timestamps at the second time, the third time, and a fourth time), then the data values in the multiple data files may be merged by the server before executing the operation (if, for example, the multiple data files were not already compacted into a new data file as described above). For example, if data values in the multiple data files each correspond to the same timestamp value, then the server may choose a data value from a most-recently modified file (or least-recently modified file) as the data value to be used for the timestamp value when executing the operation. To delete one or more data values that correspond to the same timestamp value (even if the data files are otherwise immutable), a reserved value can be written in association with the timestamp value to indicate that the previously written data value at the timestamp value should be deleted.

Thus, the server may generate new data values by performing a sequential scan of existing time-series data. As described above, because the data files may be memory mapped, the server can access the data files from memory, rather than from disk, to perform the indicated operations. The database system described herein may then achieve better performance while performing the sequential scan to produce the new data values when compared with conventional databases. Once all new data values have been generated, the database system may transmit the new data values to the user device (for example, via the server) for display in the interactive user interface.

In some aspects, the subject technology allows for real time monitoring (rather than a user having to constantly review sensor data as it arrives from the sensor). In some embodiments, the alerts are stored on the backend and run in real time over sensor data entering the system/database. The alerting service may receive the same data feed as the database by accessing the data feed directly. In an alternative embodiment, the alerting service accesses data from the time series database (as opposed to running separately but concurrently). For example, the subject technology may receive real time sensor data corresponding to a monitored value, and effectively provide instantaneous alerts based on the real time sensor data and an alert range defined by the user.

According to some implementations, the user (e.g., the engineer or operator) provides a specification that indicates an initial alert range for a measured value, and a subsequent alert schedule for the measured value. The measured value may be a temperature or pressure range of a machine, where a temperature or pressure outside an optimal operating range, and within the initial alert range, indicates suboptimal, and potentially dangerous conditions. The subsequent alert schedule may indicate for the machine to provide an alert once every threshold time period (e.g., once every 10 minutes) specified in the user-provided specification or when the measured value enters a subsequent value range specified in the user-provided specification. For example, a user concerned about water temperatures in a tank may set an initial alert to occur when the water temperature is below 13 C, and subsequent alerts to occur every hour or when the water temperature falls below 8 C. The machine provides an interface for editing the user-provided specification, for example, if the user decides that he/she wants to receive alerts using different alert ranges. For instance, in the tank example, the user may edit the interface for the initial alert to occur when the temperature is below 15 C and the subsequent alert to occur when the temperature falls below 10 C.

During operation, a server implementing the subject technology accesses the user-provided specification and monitors a physical measurement of the measured value. The physical measurement of the measured value may be received from a sensor (e.g., for noise volume or pressure) residing in the machine (or other location) that is being monitored. The server determines that the physical measurement falls within the initial alert range. The server provides an initial alert in response to the physical measurement falling within the initial alert range. The server provides a subsequent alert according to the subsequent alert schedule in the user-provided specification.

FIG. 1 illustrates an example system 100 in which alerts may be provided, according to some embodiments. As shown, the system 100 includes client devices 110, a server 120, a data repository 130, and a measurement station 150 connected with one another via a network 140. The network 140 may include the Internet, an intranet, a local area network (LAN), a wide area network (WAN), a wired network, a wireless network, and the like. In some cases, the data repository 130 or the measurement station 150 may be connected directly to the server 120 in addition to or instead of being connected to the network 140.

The client devices 110 may include laptop computers, desktop computers, mobile phones, tablet computers, personal digital assistants (PDAs), smart watches, smart televisions, and the like. One or more of the client devices 110 may be configured to present one or more of the user interfaces described in conjunction with FIGS. 3-6.

The measurement station 150 may include a physical measurement device (e.g., thermometer, barometer, noise meter, flow rate meter, scale (weight), electromagnetic sensor, volumetric sensor, radioactivity sensor, and the like) coupled with a computing device. The computing device of the measurement station reads physical measurements from the physical measurement device and provides those physical measurements to the server 120 for processing. The server 120 may generate an alert based on the physical measurements or provide the physical measurements to the data repository 143 for storage.

The data repository 130 stores physical measurements taken at the measurement station 150. Those physical measurements may be accessed, by the server 120, to generate visualizations (e.g., graphs) associated with alerts. The data repository 130 may be implemented as a database or any other data storage unit.

The server 120 generates alerts, based on the physical measurements taken at the measurement station 150, and provides those alerts to the client device 110 for display at the client device 110. Some examples of the operation of the server 120 are described in greater detail in conjunction with FIG. 2.

Figure 2:
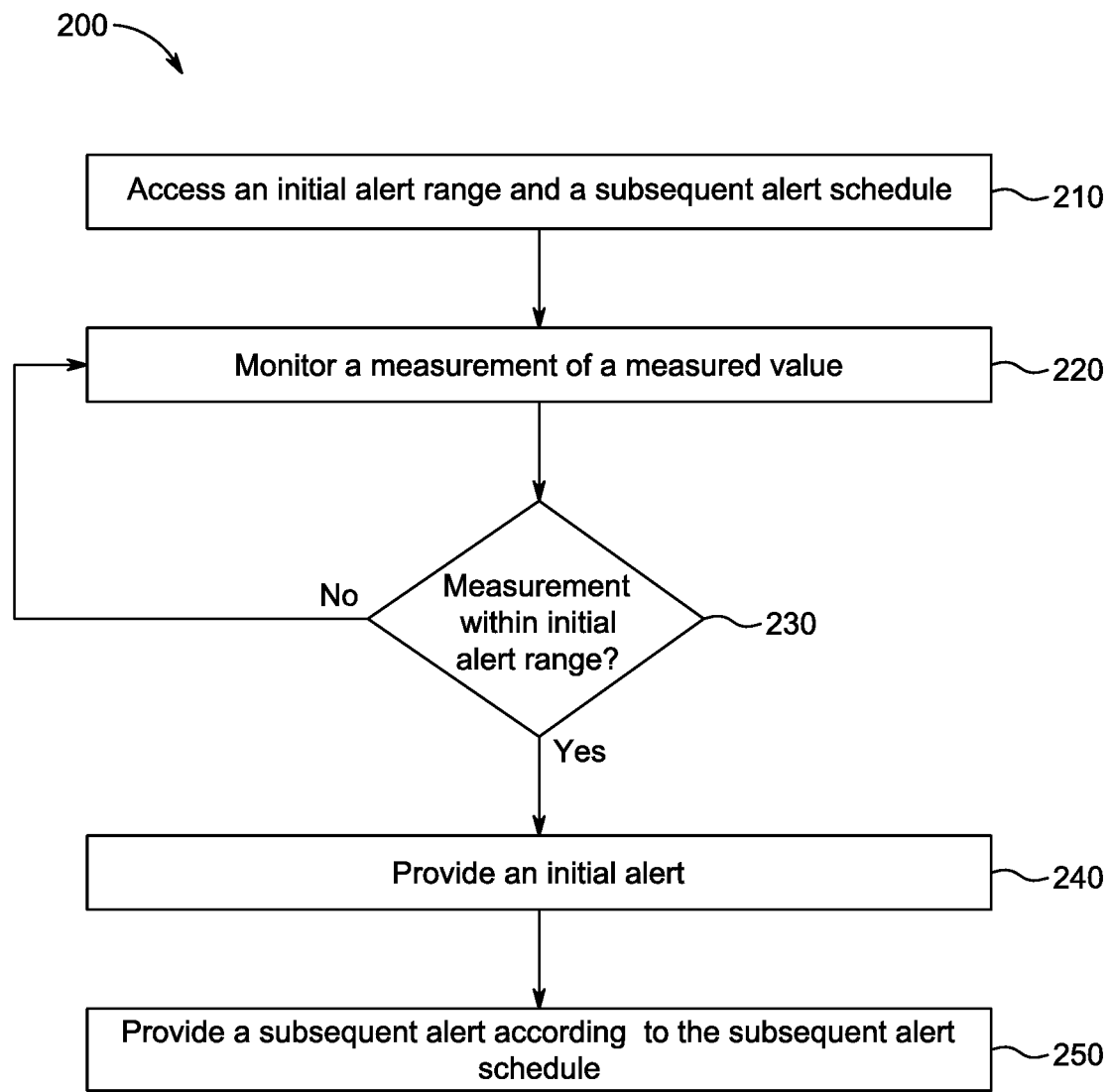
FIG. 2 is a flow chart of an example method for providing alerts, according to some embodiments.

FIG. 2 is a flow chart of an example method 200 for providing alerts, according to some embodiments. The method 200 may be implemented at the server 120 within the system 100, and is described herein as being implemented at the server 120. However, in alternative embodiments, the method 200 may be implemented at other machine(s) or within other system(s). The method 200 is not limited to being implemented at the server 120 as described herein.

At operation 210, the server 120 accesses a user-provided specification. The user-provided specification indicates an initial alert range for a measured value and a subsequent alert schedule for the measured value. The user-provided specification may be stored at the data repository 130. The user-provided specification may be entered, by a user operating the client device 110, for example, via the user interfaces shown in FIG. 3 or FIG. 4. The server 120 provides, to the client device 110, the user interface for creating or editing the user-provided specification.

At operation 220, the server 120 monitors a physical measurement of the measured value. In some embodiments, the server 120 periodically (e.g., once every ten seconds, minute, ten minutes, hour, etc.) receives a physical measurement of the measured value from the measurement station 150. The server 120 stores the received physical measurements in the data repository 130. In further embodiments, the server 120 may receive the physical measurement of the measured value from the measurement station 150 in real time. The physical measurement of the measured value is generated from sensor data produced by a sensor or from a machine coupled to a sensor.

At operation 230, the server 120 determines whether the physical measurement falls within the initial alert range from the user-provided specification accessed in operation 210. If so, the method 200 continues to operation 240. If not, the method 200 returns to operation 220.

At operation 240, in response to determining that the physical measurement falls within the initial alert range, the server 120 provides an initial alert to the client device 110. The format of the initial alert or the client device(s) 110 to which the initial alert is provided may be specified in the user-provided specification. In some cases, the initial alert range is subdivided, based on the user-provided specification, into multiple initial alert sub-ranges. In these cases, the server 120 may provide, in conjunction with the initial alert, an indication of the initial alert sub-range into which the physical measurement falls. For example, an initial alert range for a temperature may include a "cold" sub-range for below −10 C and a "hot" sub-range for above 35 C. In this case, the initial alert range would include temperatures below −10 C and temperatures above 35 C. If the temperature reaches −11 C, the server 120 may specify, in the initial alert, that the temperature is in the "cold" subrange.

Figure 5:
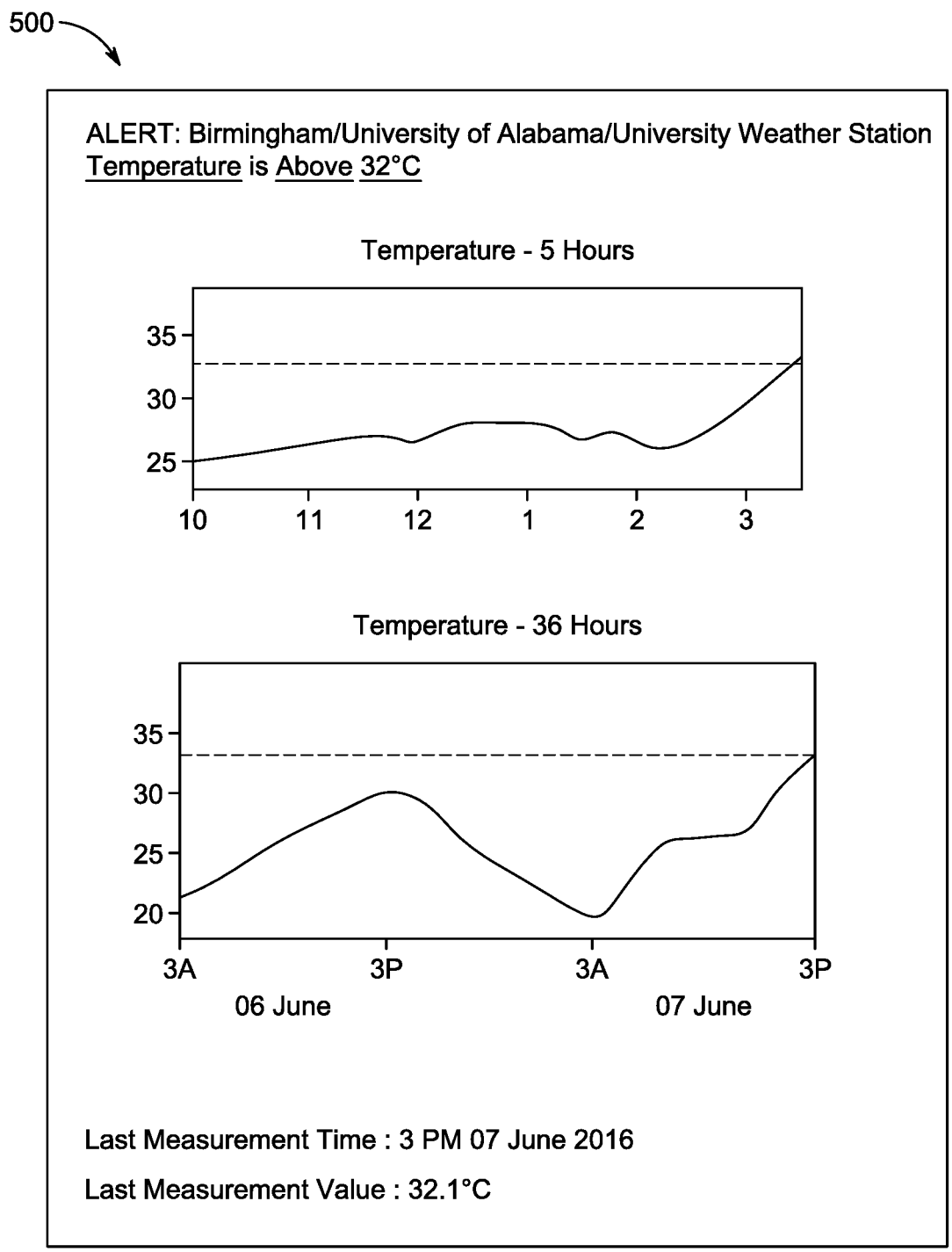
FIG. 5 illustrates an example alert, according to some embodiments.
Figure 6:
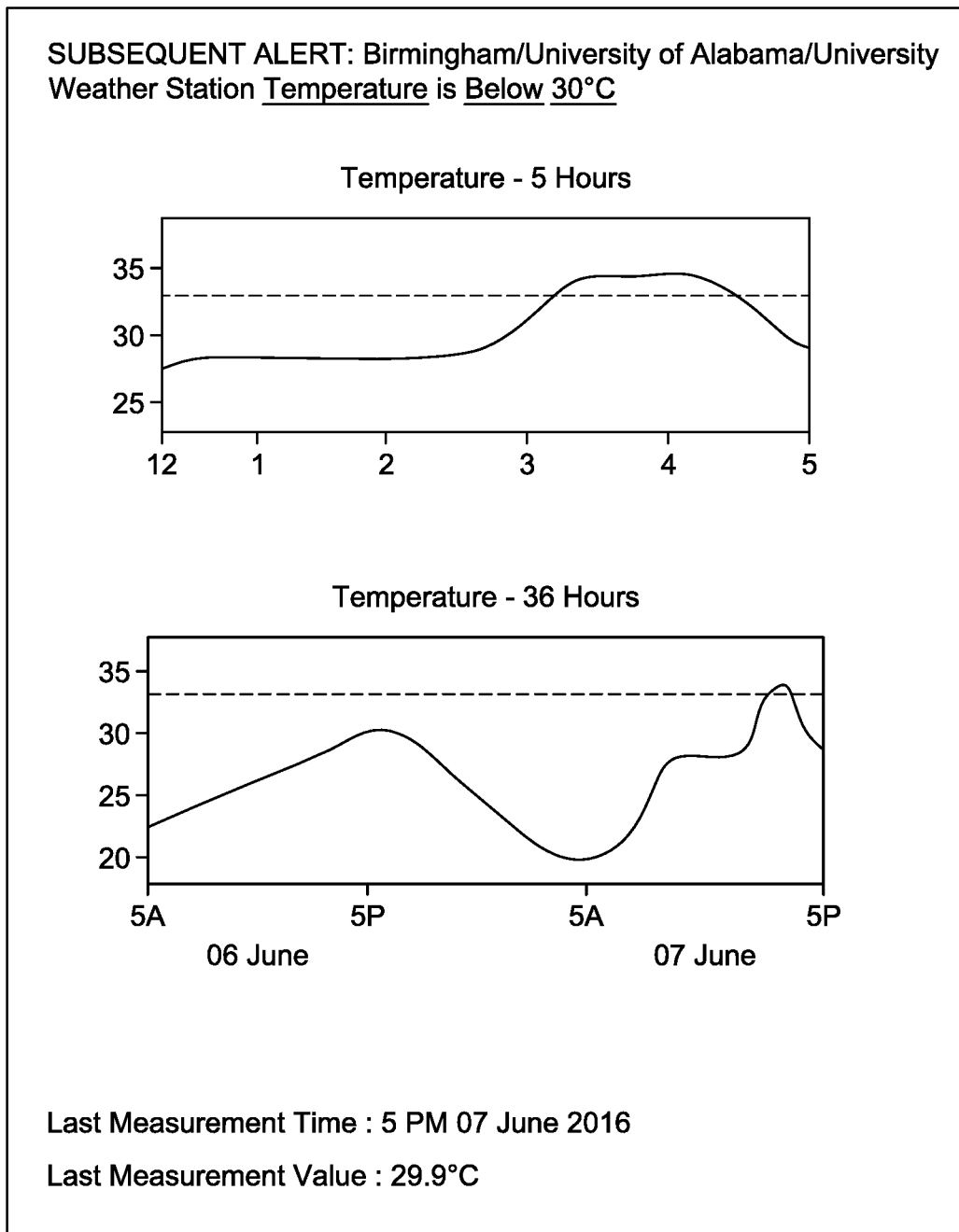
FIG. 6 illustrates an example subsequent alert, according to some embodiments.

At operation 250, the server 120 provides subsequent alert(s) according to the subsequent alert schedule in the user-provided specification. The subsequent alert schedule may specify a frequency (e.g., once every 30 minutes, 60 minutes, and the like) when subsequent alerts are to be provided or range(s) of the measured value in which subsequent alerts should be provided. In some examples, the subsequent alert schedule includes an indication to provide alerts once every threshold time period, the threshold time period being specified in the user-provided specification. In some examples, the subsequent alert schedule includes an indication to provide alerts when the measured value enters a subsequent value range in real time, the subsequent value range being specified in the user-provided specification. In some examples, the server 120 provides, in conjunction with the initial alert or the subsequent alert(s), one or more graphs of the measured value versus time, for example, as shown in FIGS. 5 and 6.

FIGS. 3-6 illustrate example interfaces, which may be presented at the client device 110, which is connected to the server 120 via the network 140 and communicates with the server 120. The server 120 may transmit data to be presented, within the example interfaces, to the client device 110. Information entered by the user of the client device 110 into the interfaces is transmitted to the server 120 over the network 140.

In some cases, the alerting system mathematically combines values in order to generate the alert. In addition to mathematically combining values in order to generate the alert, the alerting system may also apply logic to clean the data as it is processed either at the database level or at the alerter level. For example, there may be a sensor that reads in inches of a valve being opened (distance). The value may be translated into percentage open for the user to consume. This could also be used to filter erroneous values such as a negative pressure reading, or a reading outside of the sensitivity of the sensor. These errors could appear for various reasons throughout the system and the alerting machine is able to accurately reflect the trustworthy data being monitored.

FIG. 3 illustrates an example user interface 300 for a user to request an alert based on a condition measured by a sensor, according to some embodiments. The condition may be specified in the user-provided specification. After entering or selecting the requested input using the illustrated dropdown boxes, the user may cause the alert to be created by selecting the "create alert" button or may abandon the creation of the alert by selecting the "cancel" button. As shown, the user interface 300 includes a graphical user interface (GUI) for selecting an entity (e.g., identified by a region (e.g., Alabama), a city (e.g., Birmingham), a location (e.g., University of Alabama), and a point (e.g., University Weather Station)), a GUI for selecting the measured value or condition to be monitored (alert type, e.g., temperature), the measured value being associated with the entity, a GUI for selecting the initial alert range (e.g., above 32 C). As shown, the temperature being above 32 C is a condition measured by a sensor (e.g., a thermometer). In some cases, interface for generating the alert may also include a GUI for selecting the subsequent alert schedule. In an alternative embodiment, the alert type may be a pressure, and the entity may be identified as a machine, an indoor location, an outdoor location, an airplane cabin, and the like. An alert may be set if the pressure is above an upper normal operating limit or below a lower normal operating limit, with the upper and lower normal operating limits being set by an engineer.

In some cases, the subject technology allows users to "backtest" alerts. In other words, to help a user determine the correct threshold for alerting, a user may enter, using the client device 110, an alert range (e.g., temperature above 32 C). In response, the server 120 may provide for display, at the client device 110, an indication of the number of times the alert would have been provided in the past N days, months or years. This may be used to prevent the user from setting up alerts that will occur too frequently. For example, if the user is interested in tracking times when it is "very hot" the user may determine, based on the number of times the "temperature is greater than 32 C" alert would have fired in the last year, whether the threshold for "very hot" should be set at 32 C, above 32 C, or below 32 C.

FIG. 3 illustrates one user interface 300 for setting up alerts. However, other interfaces can also be used for setting up alerts. For example, some aspects of the subject technology provide for advanced alerts based on computed channels. One could take two sensors (e.g., temperature in Machine 1 and temperature in Machine 2) and set up an alert when the delta temperature (the difference between the temperature in Machine 2 and the temperature in Machine 1) exceeds a certain value. The delta temperature alert may be based on the absolute value of the delta temperature (e.g., the temperature difference between Machine 1 and Machine 2 is at least 5 C, regardless of which machine is hotter) or may account for direction (e.g., Machine 2 is at least 5 C hotter than Machine 1).

In some implementations, the subject technology enables users to set up alerts based on a rate of change. For example, if the pressure or temperature rises by a threshold percentage (e.g., 10%) within a threshold time period (e.g., 24 hours), an alert may be provided. In some implementations, the subject technology enables users to set up advanced alerting that relies on multiple conditions, for example, the temperature exceeds 32 C and the dew point exceeds 18 C.

As illustrated in FIG. 3, a user may create an alert to be delivered to him/herself/itself. However, in some cases, the subject technology allows users to create alerts to be delivered to other systems or people (e.g., people on other teams or in other departments). This may lead to increased collaboration and increased responsiveness to issues.

In some implementations, an alert provided to a user may include a link for accessing an interface or application. The interface or application may allow the user to take steps to address a problem associated with the alert (e.g., temperature or pressure conditions of industrial equipment are not optimal and are to be changed) or find out more information about the alert.

In some implementations, the subject technology provides for weekly or monthly reporting that informs the user (or an executive or supervisor of the user) which alerts were provided most frequently during the last N weeks or months. This may be used by the user, executive or supervisor to identify which issues occur most frequently or patterns in which issues occur. The user, executive or supervisor may take corrective action based on the frequent alerts (for example, by replacing equipment that is consistently operating in suboptimal conditions).

As described above, the measured value may be combined from two sensors. In some cases, the measured value may be combined from any number (not necessarily one or two) of sensors and/or static values. For example, the length of a pipe may be a constant value of ten meters. This length may be stored in the data repository 130. The user may request an alert if the pressure differential per meter is more than a value X when the flow rate is more than a value Y. The server 120 may then combine a measurement of the flow rate, a measurement from the two pressure sensors, and the constant value of "ten meters" in order to determine whether an alert is to be provided.

Figure 4:
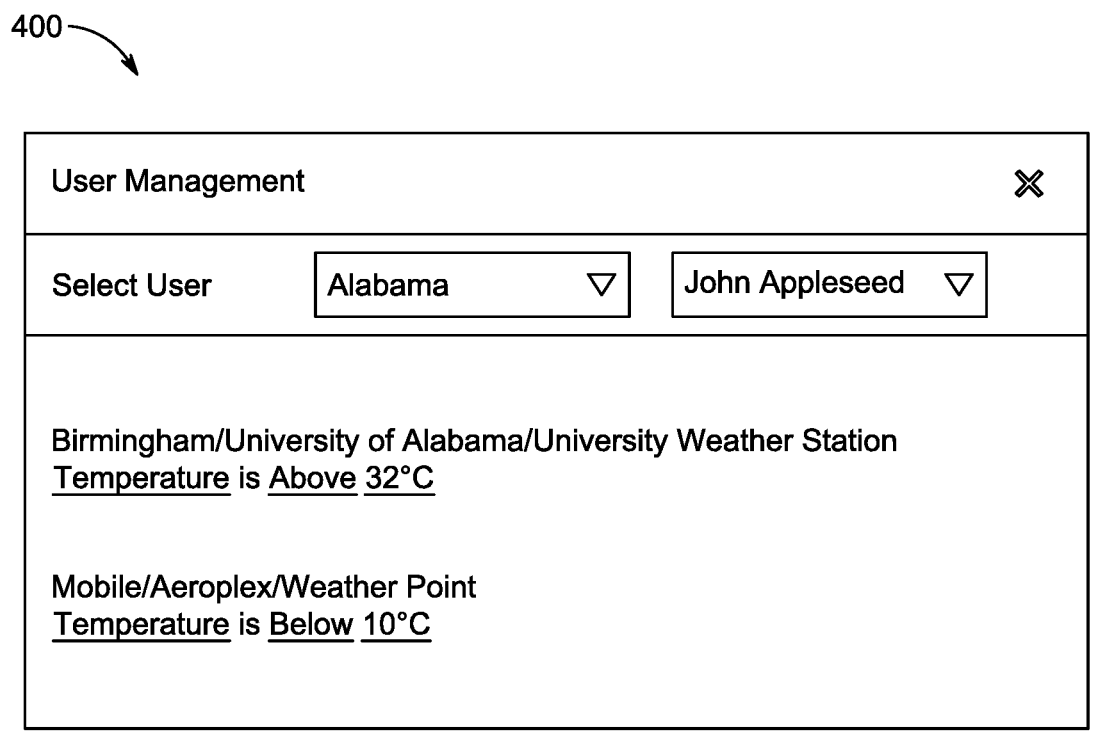
FIG. 4 illustrates an example user management interface, according to some embodiments.

FIG. 4 illustrates an example user management interface 400, according to some embodiments. The user management interface 400 may be displayed, via the client device 110 of a user (e.g., who is a manager) and may display alerts that another user has set up for a given geographic region. For example, as shown in FIG. 4, the user John Appleseed has set up two alerts for the region of Alabama. The first alert notifies John Appleseed when the temperature is above 32 C at University Weather Station of University of Alabama in Birmingham. The second alert notifies John Appleseed when the temperature is below 10 C at Weather Point of Aeroplex in Mobile. In one embodiment of the subject technology, the alerts could include pressure at a given machine being above or below a pre-defined "upper normal operating limit," "lower normal operating limit" or a user-specified pressure. The upper and lower normal operating limits may be set by an engineer and may be different for each machine.

FIG. 5 illustrates an example alert 500, according to some embodiments. As shown, the alert 500 indicates that the temperature is above 32 C at University Weather Station at University of Alabama in Birmingham. The alert 500 includes a graph of temperatures at the University Weather Station for the five hours and 36 hours (or, alternatively, other time periods) before the alert 500 was generated. The alert 500 also indicates the last measurement time and the last physical measurement value for the temperature at University Weather Station.

FIG. 6 illustrates an example subsequent alert 600, according to some embodiments. As shown, the subsequent alert 600 indicates that, subsequent to the temperature exceeding 32 C, the temperature at the University Weather Station has become below 30 C. Similarly to the alert 500, the subsequent alert 600 includes a graph of temperatures at the University Weather Station for the five hours and 36 hours (or, alternatively, other time periods) before the alert 600 was generated. In an alternative embodiment, the time periods of the graphs for the alert 500 and the subsequent alert 600 may be different (e.g., five hours and 36 hours for the alert 500 and two hours and 48 hours for the subsequent alert 600). In yet another embodiment, the time periods of one or more of the graphs for the subsequent alert 600 may be based on the amount of time since the alert 500 was generated or since another subsequent alert was generated. The alert 600 also indicates the last measurement time and the last physical measurement value for the temperature at University Weather Station.

In some cases, the alert 500 or the subsequent alert 600 includes a visualization (e.g., one or more graphs or charts) illustrating data around the alert and providing the user with a context of how the condition causing the alert came about. In some cases, the alert 500 or the subsequent alert 600 may include a link to an analytical application where the user can access additional relevant data and perform further in depth analyses or investigations. In some cases, alerts may be provided not only based on immediately observed stimuli, but in response to a combination of stimuli. For example, an alert may be provided not only when/if the temperature reaches 32 C, but if daily high temperature for N days in a row is above 32 C or if the temperature remains above 32 C for at least M hours. In some cases, an alert may be provided if the temperature is above 32 C for at least M hours and the dew point is above 15 C. These alerts may be configured by the user using interfaces similar to the user interface 300. In some cases, the subject technology allows the users to set up advanced alerts based on computed channels. For example, the user may take two sensors (e.g., pressure at sensor A and pressure at sensor B) and set up an alert when the delta pressure (e.g., difference between the pressure at sensor A and the pressure at sensor B) exceeds a certain value.

It should be noted that all of the time/date and geographic indicia provided in this application are provided as examples only and might not correspond to real observations. In other words, the temperature versus time graphs provided with this document may be inaccurate.

Figure 7:
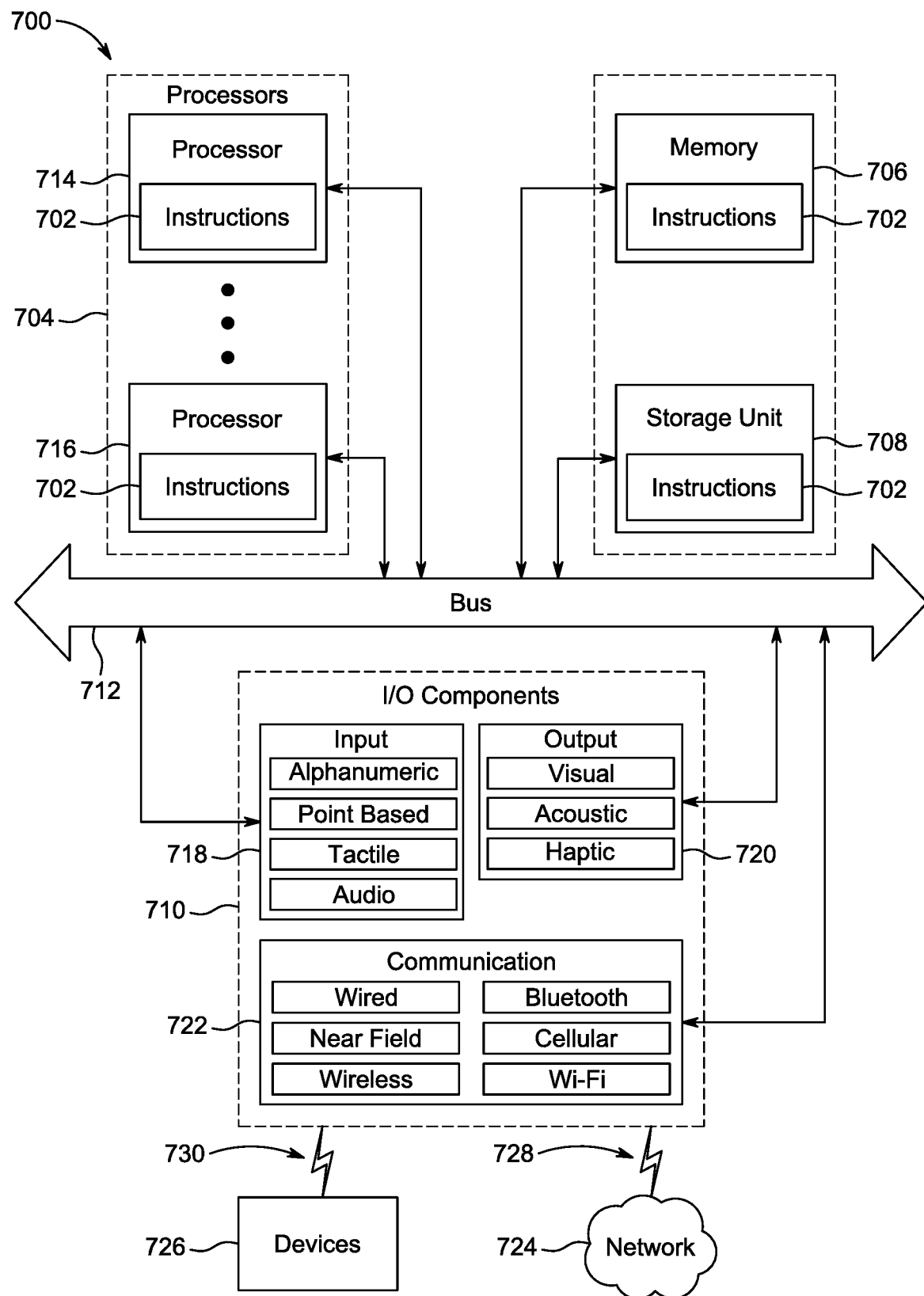
FIG. 7 is a block diagram illustrating components of a machine able to read instructions from a machine-readable medium, according to some embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. The machine 700 may correspond to one or more of the machines 110, 120, 130, and 150 of FIG. 1. Specifically, FIG. 7 shows a diagrammatic representation of the machine 700 in the example form of a system, within which instructions 702 (e.g., software, a program, an application, an applet, an app, a driver, or other executable code) for causing the machine 700 to perform any one or more of the methodologies discussed herein may be executed. For example, the instructions 702 include executable code that causes the machine 700 to execute the method 200. In this way, these instructions transform the general, non-programmed machine into a particular machine programmed to carry out the described and illustrated functions in the manner described herein. The machine 700 may operate as a standalone device or may be coupled (e.g., networked) to other machines.

By way of non-limiting example, the machine 700 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 702, sequentially or otherwise, that specify actions to be taken by machine 700. Further, while only a single machine 700 is illustrated, the term "machine" shall also be taken to include a collection of machines 700 that individually or jointly execute the instructions 702 to perform any one or more of the methodologies discussed herein.

The machine 700 may include processors 704, memory 706, storage unit 708 and I/O components 710, which may be configured to communicate with each other such as via a bus 712. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 714 and processor 716 that may execute instructions 702. The term "processor" is intended to include multi-core processors that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core process), multiple processors with a single core, multiple processors with multiples cores, or any combination thereof.

The memory 706 (e.g., a main memory or other memory storage) and the storage unit 708 are both accessible to the processors 704 such as via the bus 712. The memory 706 and the storage unit 708 store the instructions 702 embodying any one or more of the methodologies or functions described herein. In some embodiments, the database 76 resides on the storage unit 708. The instructions 702 may also reside, completely or partially, within the memory 706, within the storage unit 708, within at least one of the processors 704 (e.g., within the processor's cache memory), or any suitable combination thereof, during execution thereof by the machine 700. Accordingly, the memory 706, the storage unit 708, and the memory of processors 704 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 702. The term "machine-readable medium" shall also be taken to include any medium, or combination of multiple media, that is capable of storing instructions (e.g., instructions 702) for execution by a machine (e.g., machine 700), such that the instructions, when executed by one or more processors of the machine 700 (e.g., processors 704), cause the machine 700 to perform any one or more of the methodologies described herein (e.g., method 200). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, in some examples, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device. In other examples, the "machine-readable medium" includes a transitory medium or transitory media. The instructions described in this application can be carried by any medium, which can comprise a non-transitory machine-readable medium and a transitory medium such as a signal or transmission medium.

The I/O components 710 may include a wide variety of components to receive input, provide output, produce output, transmit information, exchange information, capture physical measurements, and so on. The specific I/O components 710 that are included in a particular machine will depend on the type of machine. For example, portable machines such as mobile phones will likely include a touch input device or other such input mechanisms, while a headless server machine will likely not include such a touch input device. It will be appreciated that the I/O components 710 may include many other components that are not specifically shown in FIG. 7. The I/O components 710 are grouped according to functionality merely for simplifying the following discussion and the grouping is in no way limiting. In various example embodiments, the I/O components 710 may include input components 718 and output components 720. The input components 718 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 710 may include communication components 722 operable to couple the machine 700 to a network 724 or devices 726 via coupling 728 and coupling 730, respectively. For example, the communication components 722 may include a network interface component or other suitable device to interface with the network 724. In further examples, communication components 722 may include wired communication components, wireless communication components, cellular communication components, near field communication (NFC) components, Bluetooth® components (e.g., Bluetooth® Low Energy), WiFi® components, and other communication components to provide communication via other modalities. The devices 726 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
   one or more hardware processors of a machine;
   a memory storing instructions which, when executed by the one or more hardware processors, cause the machine to perform operations comprising:
      receiving an alert specification as a user input through a graphical user interface (GUI), the alert specification comprising:
         an identification of the measured value that comprises a combination of a first data value from a first sensor and a second data value from a second sensor,
         an initial alert range for the measured value,
         a subsequent alert schedule based, at least in part, on the initial alert range having been triggered, the subsequent alert schedule indicating a subsequent alert range for the measured value and a frequency with which a subsequent alert is to be provided;
      accessing a data feed that comprises sensor data and corresponding timestamp values from a plurality of time-series data sets, the sensor data comprising real-time measurements of the first data value and the second data value;
      computing the measured value in real-time based on the first value and the second value;
      determining that the computed measured value falls within the initial alert range;
      providing the initial alert in response to the computed measured value falling within the initial alert range; and
      providing the subsequent alert according to the subsequent alert schedule.

2. The system of claim 1, the operations further comprising:
   detecting an overlapping range of timestamp values from the plurality of time-series data sets, the overlapping range of timestamp values comprising at least a matching pair of timestamp values that correspond with the first data value and the second data value;
   identifying a most-recent timestamp value from among the plurality of time-series data sets in response to the detecting the overlapping range of timestamp values, the most-recent timestamp value corresponding to a data value that includes either the first data value or the second data value; and computing the measured value based on the data value that corresponds to the most-recent timestamp value.

3. The system of claim 1, wherein the subsequent alert schedule comprises an indication to provide alerts once every threshold time period, the threshold time period being specified in the alert specification.

4. The system of claim 1, wherein the subsequent alert schedule comprises an indication to provide alerts when the measured value enters a subsequent value range in real time, the subsequent value range being specified in the alert specification.

5. The system of claim 1, the operations further comprising:
enabling, by the GUI, one or more edits to the alert specification.

6. The system of claim 1, the operations further comprising:
providing, in conjunction with the initial alert or the subsequent alert, one or more graphs of the measured value versus time over a period of time.

7. The system of claim 1, wherein the initial alert range is subdivided, based on the alert specification, into a plurality of initial alert sub-ranges, the operations further comprising:
providing, in conjunction with the initial alert, an indication of one of the initial alert sub-ranges in response to the measured value falling within the one of the initial alert sub-ranges.

8. The system of claim 1, wherein the measured value comprises a difference between the first value and the second value.

9. The system of claim 1, the operations further comprising:
providing an indication of a total number of initial alerts or a total number of subsequent alerts generated during a specified time period.

10. A non-transitory machine-readable medium storing instructions which, when executed by a machine, cause the machine to perform operations comprising:
receiving an alert specification as a user input through a graphical user interface (GUI), the alert specification comprising:
an identification of the measured value that comprises a combination of a first data value from a first sensor and a second data value from a second sensor,
an initial alert range for the measured value,
a subsequent alert schedule based, at least in part, on the initial alert range having been triggered, the subsequent alert schedule indicating a subsequent alert range for the measured value and a frequency with which a subsequent alert is to be provided;
accessing a data feed that comprises sensor data and corresponding timestamp values from a plurality of time-series data sets, the sensor data comprising real-time measurements of the first data value and the second data value;
computing the measured value in real-time based on the first value and the second value;
determining that the computed measured value falls within the initial alert range;
providing the initial alert in response to the computed measured value falling within the initial alert range; and
providing the subsequent alert according to the subsequent alert schedule.

11. The machine-readable medium of claim 10, the operations further comprising:
detecting an overlapping range of timestamp values from the plurality of time-series data sets, the overlapping range of timestamp values comprising at least a matching pair of timestamp values that correspond with the first data value and the second data value;
identifying a most-recent timestamp value from among the plurality of time-series data sets in response to the detecting the overlapping range of timestamp values, the most-recent timestamp value corresponding to a data value that includes either the first data value or the second data value; and
computing the measured value based on the data value that corresponds to the most-recent timestamp value.

12. The machine-readable medium of claim 10, wherein the subsequent alert schedule comprises an indication to provide alerts once every threshold time period, the threshold time period being specified in the alert specification.

13. The machine-readable medium of claim 10, wherein the subsequent alert schedule comprises an indication to provide alerts when the measured value enters a subsequent value range in real time, the subsequent value range being specified in the alert specification.

14. The machine-readable medium of claim 10, the operations further comprising:
enabling, by the GUI, one or more edits to the alert specification.

15. The machine-readable medium of claim 10, the operations further comprising:
providing, in conjunction with the initial alert or the subsequent alert, one or more graphs of the measured value versus time over a period of time.

16. The machine-readable medium of claim 10, wherein the initial alert range is subdivided, based on the alert specification, into a plurality of initial alert sub-ranges, the operations further comprising:
providing, in conjunction with the initial alert, an indication of one of the initial alert sub-ranges in response to the measured value falling within the one of the initial alert sub-ranges.

17. The machine-readable medium of claim 10, wherein the measured value comprises a difference between the first value and the second value.

18. The machine-readable medium of claim 10, the operations further comprising:
providing an indication of a total number of initial alerts or a total number of subsequent alerts generated during a specified time period.

19. A method comprising:
receiving an alert specification as a user input through a graphical user interface (GUI), the alert specification comprising:
an identification of the measured value that comprises a combination of a first data value from a first sensor and a second data value from a second sensor,
an initial alert range for the measured value,
a subsequent alert schedule based, at least in part, on the initial alert range having been triggered, the subsequent alert schedule indicating a subsequent alert range for the measured value and a frequency with which a subsequent alert is to be provided;
accessing a data feed that comprises sensor data and corresponding timestamp values from a plurality of time-series data sets, the sensor data comprising real-time measurements of the first data value and the second data value;

computing the measured value in real-time based on the first value and the second value;

determining that the computed measured value falls within the initial alert range;

providing the initial alert in response to the computed measured value falling within the initial alert range; and providing the subsequent alert according to the subsequent alert schedule.

20. The method of claim 19, further comprising:

detecting an overlapping range of timestamp values from the plurality of time-series data sets, the overlapping range of timestamp values comprising at least a matching pair of timestamp values that correspond with the first data value and the second data value;

identifying a most-recent timestamp value from among the plurality of time-series data sets in response to the detecting the overlapping range of timestamp values, the most-recent timestamp value corresponding to a data value that includes either the first data value or the second data value; and computing the measured value based on the data value that corresponds to the most-recent timestamp value.

\* \* \* \* \*

UNITED STATES PATENT AND TRADEMARK OFFICE
CERTIFICATE OF CORRECTION

PATENT NO. : 10,692,350 B2
APPLICATION NO. : 16/689915
DATED : June 23, 2020
INVENTOR(S) : Cho et al.

Page 1 of 1

It is certified that error appears in the above-identified patent and that said Letters Patent is hereby corrected as shown below:

On the Title Page

In item (73), in "Assignee", in Column 1, Line 1, delete "Tschngmgies" and insert --Technologies-- therefor Signed and Sealed this
Twenty-second Day of December, 2020

Andrei Iancu
*Director of the United States Patent and Trademark Office*